(12) United States Patent  
Song et al.

(10) Patent No.: US 9,041,782 B2  
(45) Date of Patent: May 26, 2015

(54) MULTIPLE-VIEWER AUTO-STEREOSCOPIC 3D DISPLAY APPARATUS

(71) Applicant: SuperD Co. Ltd., Shenzhen (CN)

(72) Inventors: Lei Song, Shenzhen (CN); Yinwei Chen, Shenzhen (CN); Ning Liu, Shenzhen (CN); Zhang Ge, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 285 days.

(21) Appl. No.: 13/872,199

(22) Filed: Apr. 29, 2013

(65) Prior Publication Data

US 2014/0307068 A1    Oct. 16, 2014

(30) Foreign Application Priority Data

Apr. 16, 2013   (CN) .......................... 2013 1 0132046

(51) Int. Cl.
*H04N 13/04* (2006.01)

(52) U.S. Cl.
CPC .................................. *H04N 13/0402* (2013.01)

(58) Field of Classification Search
CPC ... H04N 13/00; H04N 13/04; H04N 13/0402; H04N 13/0445; H04N 13/045; H04N 13/0456; H04N 13/0497; G06T 2207/10012; G06T 2207/10021

USPC .................. 348/54, 42, 51, 58; 345/419, 426; 382/154

IPC .............................................. H04N 13/00,13/04

See application file for complete search history.

(56) References Cited

U.S. PATENT DOCUMENTS

2011/0090324 A1*  4/2011  Mentz et al. ..................... 348/55  
2011/0134231 A1*  6/2011  Hulvey et al. .................... 348/56

* cited by examiner

*Primary Examiner* — Sherrie Hsia  
(74) *Attorney, Agent, or Firm* — Anova Law Group, PLLC (57) ABSTRACT

A multiple-viewer auto-stereoscopic display apparatus includes a display unit, an eye-tracking unit, a light transmission control unit, a light separation unit, and a synchronization control unit. The display unit is configured to display a view sequence of a plurality of view images of a 3D image in multiple viewing zones to one or more viewers. The light transmission control unit is configured to control light transmission to a particular viewing zone. The light separation unit is configured to separate the plurality of view images for the viewers to perceive 3D display. Further, the synchronization control unit is configured to synchronize refreshing of the display unit and the light transmission control unit, wherein a refreshing rate of the display unit equals to a refreshing rate of the light transmission control unit, and to dynamically adjust the view sequence based on the position information of the one or more viewers.

17 Claims, 5 Drawing Sheets

MULTIPLE-VIEWER AUTO-STEREOSCOPIC 3D DISPLAY APPARATUS

CROSS-REFERENCES TO RELATED APPLICATIONS

This application claims the priority of Chinese patent application number 201310132046.4, filed on Apr. 16, 2013, the entire contents of which are incorporated herein by reference.

FIELD OF THE INVENTION

The present invention generally relates to auto-stereoscopic display technologies and, more particularly, to the apparatus for multiple-viewer auto-stereoscopic display.

BACKGROUND

Current 3D display technologies generally include stereoscopic display and auto-stereoscopic display. Stereoscopic display requires some type of headgear or glasses to realize 3D display. Auto-stereoscopic display, also known as glasses-less 3D or glasses-free 3D, does not utilize special viewing devices (e.g., special spectacles or headgear). These auto-stereoscopic display technologies may provide more colorful, realistic and life-like visual entertainment experience for users, which can be widely used in various fields.

Auto-stereoscopic 3D display technologies enable viewers to perceive 3D images at different viewing locations without wearing 3D glasses. Further, auto-stereoscopic 3D display systems utilize grating devices to control images to be viewed by the left eye and the right eye of the viewer. A viewer's left eye and right eye respectively view the same image content but with different directions.

Figure 1:
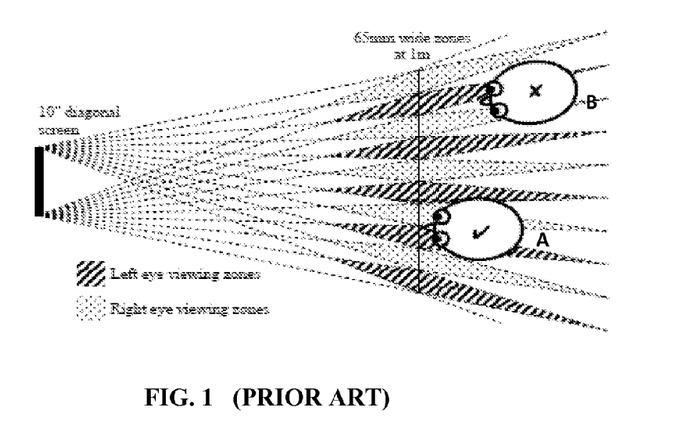
FIG. 1 illustrates a current 3D display system.

However, these conventional auto-stereoscopic display technologies may often support just one perfect viewing angle or zone. FIG. 1 shows a current 3D system. As shown in FIG. 1, the screen may direct two slightly different images, in different directions, towards viewer's left eye and right eye to create the 3D effect. The fully 3D effect may be captured when standing at the location A within the correct viewing zone. However, when standing at the location B within the inverse viewing zone (outside the correct viewing zone), the viewer's eyes see an incorrect and pseudoscopic image made up of parts of both the left and right images. Thus, due to the presence of the inverse viewing zone, the viewer is restricted to the viewing zone with the ideal distance and the correct angle in order to perceive 3D images.

To solve the above problems, other conventional 3D display technologies reduce the inverse viewing zone by increasing the number of 3D images displayed on the display screen. However, the resolution of a display apparatus may be greatly reduced, resulting in degrading of display quality. The disclosed apparatus is directed to solve one or more problems set forth above and other problems.

BRIEF SUMMARY OF THE DISCLOSURE

One aspect of the present disclosure includes a multiple-viewer auto-stereoscopic display apparatus. The display apparatus includes a display unit, an eye-tracking unit, a light transmission control unit, a light separation unit, and a synchronization control unit. The display unit is configured to display a view sequence of a plurality of view images of a 3D image in multiple viewing zones to one or more viewers. The light transmission control unit is configured to control light transmission to a particular viewing zone. The light separation unit is configured to separate the plurality of view images for the viewers to perceive 3D display. Further, the synchronization control unit is configured to synchronize refreshing of the display unit and the light transmission control unit, wherein a refreshing rate of the display unit equals to a refreshing rate of the light transmission control unit, and to dynamically adjust the view sequence based on the position information of the one or more viewers.

Another aspect of the present disclosure includes a method for a multiple-viewer auto-stereoscopic display apparatus for displaying on a display unit a view sequence of a plurality of view images of a 3D image in multiple viewing zones to one or more viewers. The method includes using a light transmission control unit to control light transmission to a particular viewing zone, and separating the plurality of view images for the viewers to perceive 3D display. The method also includes synchronize refreshing of the display unit and the light transmission control unit display the view images into the multiple viewing zones by time-multiplexing, wherein a refreshing rate of the display unit equals to a refreshing rate of the light transmission control unit. Further, the method includes dynamically adjust the view sequence based on the position information of the one or more viewers.

Other aspects of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 2:
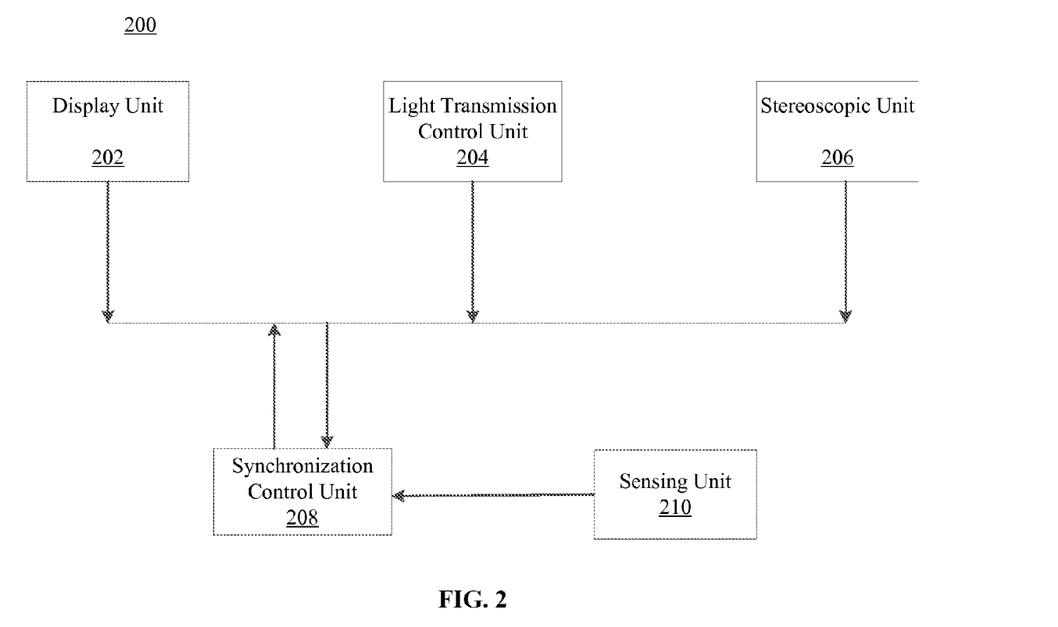
FIG. 2 illustrates a block diagram of a multiple-viewer auto-stereoscopic 3D display apparatus consistent with the disclosed embodiments.

FIG. 2 shows a block diagram of a multiple-viewer auto-stereoscopic 3D display apparatus 200. As shown in FIG. 2, the 3D display apparatus includes a display unit 202, a light transmission control unit 204, a stereoscopic unit 206, a synchronization control unit 208, and a sensing unit 210. Other components may be added and certain devices may be omitted without departing from the principles of the disclosed embodiments. Further, space between various components is shown for illustrative purposes, the disclosed embodiments may or may not have such space.

The 3D display apparatus 200 may be used to display 3D images with a high resolution for multiple viewers. Display unit 202 may be provided with sets of images to be viewed by a viewer's left eye and right eye separately. Each image is from a different viewpoint. For example, a stereo (two viewpoints) 3D image may include an image for the viewer's left eye (i.e., a left image or a left view image) and an image for the viewer's right eye (i.e., a right image or a right view image), with a certain parallax between the left image and the right image.

The 3D display apparatus 200 may also display full-resolution two-dimensional (2D) images, and may switch between a 2D display mode and a 3D display mode dynamically. Further, the 3D display apparatus 200 may also have 2D display and 3D display on a same display unit at the same time. For example, when multiple display windows are opened on display unit 202, certain display window or windows may display 3D images, while certain display windows may display 2D images, and each display window may switch 2D display mode to 3D display mode or vice versa dynamically.

Display unit 202 may include any appropriate device with a high refreshing rate for displaying images, such as a plasma display panel (PDP) display, a cathode ray tube (CRT) display, a liquid crystal display (LCD), an organic light emitting diode (OLED) display, and other types of displays. A polarizer sheet may be positioned over display unit 202 to make light from display unit 202 linearly polarized when display unit 202 is PDP display panel, OLED display panel, and other types of displays.

Display unit 202 may have a certain refreshing rate for refreshing images on the display unit. As used herein, a refreshing rate of a display unit (e.g., an LCD) refers to the number of times per second in which the display unit draws the data being given. For example, an LCD may often refresh at 60 Hz. A high refreshing rate can update or draw images quickly, drastically reducing motion blur. In certain embodiments, the refreshing rate for display unit 202 (under the control of the light transmission control unit 204) may be no lower than 240 Hz. The display unit 202 and light transmission control unit 204 control 3D images displayed in different viewing zones.

Light transmission control unit 204 may be configured to provide various images and display control functionalities. For example, light transmission control unit 204 may control the direction of the light transmission, and light transmission control unit 204 may be configured to adjust the screen-viewing angle. A screen-viewing angle is the maximum angle at which a 3D display can be viewed with desired visual performance. Specifically, light transmission control unit 204 may control the light from the display unit 202 onto multiple specified viewing zones at different times, respectively. That is, the view images in separate viewing zones are time-multiplexed such that only one viewing zone is displayed at a particular time. In such configuration, the total number of view images to be displayed can be substantially reduced.

To form multiple specified viewing zones, the 3D display apparatus 200 may maintain a high refreshing rate. That is, the display unit 20 and the light transmission control unit 204 may have a high refreshing rate. For example, the refreshing rate may be higher than or equal to 120 Hz to form two viewing zones. The refreshing rate may be higher than or equal to 180 Hz to form three viewing zones, and so on. When the number of viewing zones is defined by N (N=1, 2, 3, ... ), the refreshing rate may be higher than or equal to N*60 Hz to form N viewing zones.

Light transmission control unit 204 may include a plurality of grating elements to enable multiple viewing zones of 3D image display. Each of the plurality of grating elements may include a lenticular grating and a slit grating. The slit grating may be a dynamically controllable slit grating of switchable translucent and non-translucent area. The lenticular grating or lenticular lens transmits the light emitted from the slit to specified viewing zones at a given time.

Stereoscopic unit 206 or 3D light separation unit 206 may include any appropriate optical device capable of generating 3D effects by separating sets of images in the viewing zones for a single viewer or multiple viewers to perceive 3D images. That is, the stereoscopic unit 206 or 3D light separation unit 206 may separate lights from different view images such that the different view images can be viewed from different eye positions to achieve 3D effect. For example, stereoscopic unit 206 may include a parallax barrier (e.g., a slit grating) or a lenticular lens to separate the light into different directions for a viewer(s). Other types of structures may also be included.

Figure 3:
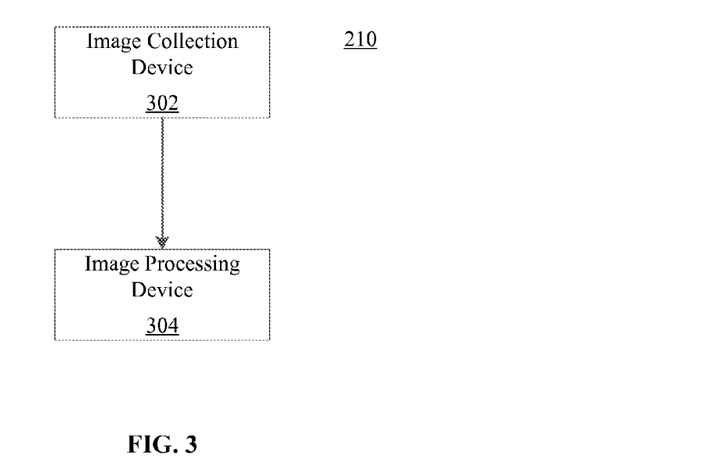
FIG. 3 illustrates a block diagram of an eye-tracking unit consistent with the disclosed embodiments.

The sensing unit 210 may include any appropriate device providing location or position information of the viewer or viewers. For example, sensing unit 210 may be an eye-tracking unit, and the eye-tracking unit 210 may be configured to track the movement of a viewer or viewers. In certain embodiments, eye-tracking unit 210 is configured to monitor multiple users' eyes movements, and to determine where the users are looking on the display unit such as fixations, saccades, and regressions. FIG. 3 shows a block diagram of an eye-tracking unit 210 consistent with the disclosed embodiments.

As shown in FIG. 3, eye-tracking unit 210 includes an image collection device 302 and an image-processing device 304. Image collection device 302 may include any appropriate device for capturing real-time data of users' eyes positions, such as one or more cameras or webcams. Image processing device 304 may compute, extract and analyze the real-time data captured by image collection device 302 by using certain predetermined algorithms. Thus, eye-tracking unit 210 may determine where viewers are looking at any given time, and how viewers' eyes/heads are moving from one location to another in the viewing zone. Eye-tracking unit 210 sends position information of the viewer(s) to synchronization control unit 208.

Synchronization control unit 208 may include any appropriate device capable of providing control functionalities for the 3D display apparatus 200, including display unit 202, light transmission control unit 204, and stereoscopic unit 206. For example, synchronization control unit 208 may control the synchronization between the display unit 202 and the light transmission control unit 204. That is, the refreshing of the display unit 202 and the refreshing of light transmission control unit 204 may be synchronized by the synchronization control unit 208. Further, the refreshing rate of the display unit 202 may be configured to the same as the refreshing rate of the light transmission control unit 204. Any types of refreshing rate may be used.

In certain embodiments, the refreshing rate of the display unit 202 and/or light transmission control unit 204 may refer to a frame rate, i.e., how may images displayed per second. In such case, during each time of refreshing, the light of each image displayed by the display unit 202 is controlled by the light transmission control unit 204 into a viewing zone, and the images refreshed by the display unit 202 and the light transmission control unit 204 form a view sequence. A refreshing may cause a view image displayed in a next viewing zone neighboring a current view zone.

Figure 4:
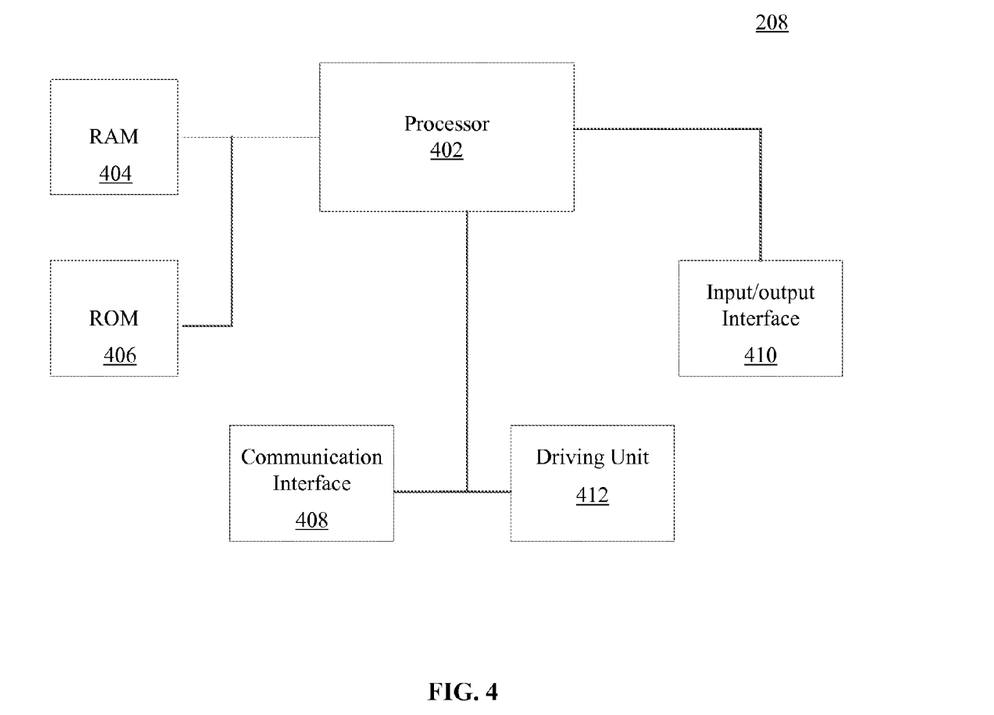
FIG. 4 illustrates a block diagram of an exemplary synchronous control unit consistent with the disclosed embodiments.

FIG. 4 shows an exemplary block diagram of synchronization control unit 208.

As shown in FIG. 4, synchronization control unit 208 may include a processor 402, a random access memory (RAM) unit 404, a read-only memory (ROM) unit 406, a communication interface 408, an input/output interface unit 410, and a driving unit 412. Other components may be added and certain devices may be removed without departing from the principles of the disclosed embodiments.

Processor 402 may include any appropriate type of graphic processing unit (GPU), general-purpose microprocessor, digital signal processor (DSP) or microcontroller, and application specific integrated circuit (ASIC), etc. Processor 402 may execute sequences of computer program instructions to perform various processes associated with display system. The computer program instructions may be loaded into RAM 404 for execution by processor 402 from read-only memory 406.

Communication interface 408 may provide communication connections such that display system may be accessed remotely and/or communicate with other systems through computer networks or other communication networks via various communication protocols, such as transmission control protocol/internet protocol (TCP/IP), hyper text transfer protocol (HTTP), etc.

Input/output interface 410 may be provided for users to input information into 3D display apparatus 200 or for the viewers to receive information from 3D display apparatus 200. For example, input/output interface 410 may include any appropriate input device, such as a remote control, a keyboard, a mouse, an electronic tablet, voice communication devices, or any other optical or wireless input devices. Further, driving unit 412 may include any appropriate driving circuitry to drive various devices, such as the display unit and other optical devices.

Figure 5:
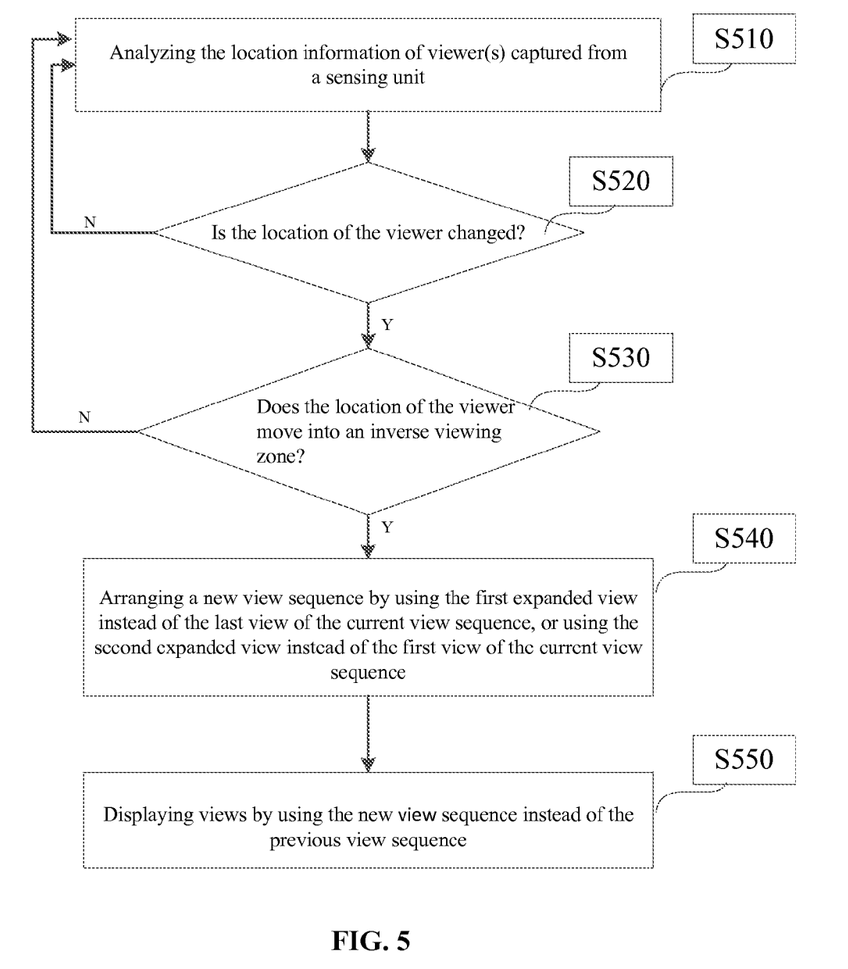
FIG. 5 illustrates a flow diagram of a 3D image arrangement method consistent with the disclosed embodiments.

During operation, 3D display apparatus 200 (e.g., processor 402) may perform certain processes to control 3D display. FIG. 5 illustrates a flow diagram of a 3D display control method consistent with the disclosed embodiments.

As shown in FIG. 5, at the beginning, synchronization control unit 208 analyzes the location or position of a viewer or viewers captured by the sensing unit 210 (e.g., eye-tracking unit 210) (S510). Based on the analyzed results, synchronization control unit 208 may determine whether any viewer changes location or whether any viewer is located between two neighboring viewing zones (S520). If the synchronization control unit 208 determines that the location of the viewer does not change and/or there is no viewer(s) located between two neighboring viewing zones (S520; N), the synchronization control unit 208 continues analyzing the location of the viewers captured by the sensing unit 210 in S510.

If the synchronization control unit 208 determines that the location of the viewer is changed and/or there is a viewer or viewers located between two neighboring viewing zones (S520; Y), the synchronization control unit 208 judges whether the viewer is located in an inverse viewing zone (S530). For example, the synchronization control unit 208 may determine if any viewer is already in an inverse viewing zone, or any viewer is moving to an inverse viewing zone.

If the synchronization control unit 208 determines that the viewer is not located in the inverse viewing zone (S530; N), the synchronization control unit 208 continues analyzing the location of the viewer captured by the sensing unit 210 in S510.

On the other hand, if the synchronization control unit 208 determines that the viewer is located in the inverse viewing zone (S530; Y), the synchronization control unit 208 may adjust or rearrange the multiple view images of the 3D image of corresponding viewing zones (S540). That is, the view images of certain viewing zones are rearranged by synchronization control unit 208 with a new view sequence such that the viewer is located in a correct viewing zone.

The different views correspond to different images seen in different viewing zones. A view sequence is a number of ordered views to form a stereoscopic view area. For example, in a sequence of four views, there are the first view (1view), the second view (2view), the third view (3view), and the fourth view (4view). The parallaxes between any two adjacent views are the same in a sequence. The parallax between 1view and 2view is the same as the parallax between 2view and 3view. The parallax between 2view and 3view is the same as the parallax between 3view and 4view. When the viewing zones or viewing areas change, the view sequence may also need to be changed in order to ensure the desired viewing experience.

A new sequence of views may use the first expanded view instead of the last view of the current sequence of views, or use the second expanded view instead of the first view of the current sequence of views. The parallaxes between any two adjacent views are the same in the new sequence. For example, a new view sequence (2view, 3view, 4view, 5view) is formed after the expanded view (5view) replaces the first view (1view). The parallaxes between any two adjacent views are the same in the new sequence (2view, 3view, 4view, 5view). Or a new view sequence (0view, 1view, 2view, 3view) is formed after the expanded view (0view) replaces the fourth view (4view). The parallaxes between any two adjacent views are the same in the new sequence (0view, 1view, 2view, 3view).

An initial view sequence can be represented by {iview}, i=1, 2, . . . , N, where the number of views N is a positive integer greater than or equal to 2, and iview is the $i^{th}$ view (e.g., the first view is 1view, the $N^{th}$ view is Nview). A new view sequence (0view, 1view, 2view, . . . , N−1view) is formed after the expanded view 0view replaces Nview. Or a new view sequence (2view, . . . , Nview, N+1view) is formed after the expanded view N+1view replaces 1view. The parallaxes between any two adjacent views are the same in the new sequence.

When either the first expanded view or the second expanded view is used, a new view is generated or added in the previous view sequence to obtain the new sequence of views. Optionally or alternatively, the new view sequence may also be obtained by shifting the current view sequence by an offset. That is, by shifting the current view sequence, the inverse viewing zone can be moved away from the viewer or viewers such that the viewer or viewer is located in a correcting viewing zone in the new view sequence (i.e., a shifted current view sequence). Other methods to obtain the new view sequence may also be used, as long as the viewer can be located in a correct viewing zone after the new view sequence is obtained.

After the sequence of the views is rearranged, the 3D display apparatus 200 or the synchronization control unit 208 may display the views using the new sequence instead of the previous sequence (S550).

Although the synchronization control unit 208 may determine whether the location of the viewer is changed and/or there is a viewer or viewers located between two neighboring viewing zones, such determination may also be performed by sensing unit 210. That is, based on position information of the viewers and/or other system information, the sensing unit 210 may determine whether the location of the viewer is changed and/or there is a viewer or viewers located between two neighboring viewing zones.

If sensing unit 210 determines that the location of the viewer is changed or there is any viewer located between two neighboring viewing zones, the synchronization control unit 208 may further determine whether any viewer is located in an inverse viewing zone. The sensing unit 210 may thus include a detection unit and a transmission unit (not shown). The detection unit may be used to detect, for example, whether there is any viewer located between two neighboring viewing zones. The transmission unit may be used to obtain the position information of the viewer when there is any viewer located between two neighboring viewing zones, and further sends the position information to the synchronization control unit 208.

Figure 6:
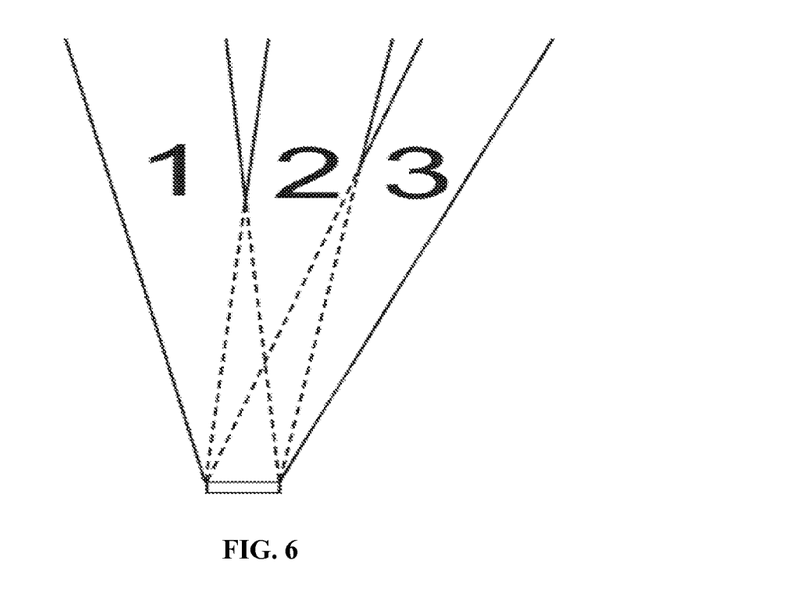
FIG. 6 illustrates an exemplary operating process of a 3D display apparatus consistent with the disclosed embodiments.

For the view sequence arrangement, lights of view images for the viewing areas/zones are controlled by light transmission control unit 204 to ensure that the view images are displayed in the viewing zones/areas with considerations of the position(s) of the viewer or viewers. FIG. 6 illustrates one exemplary operating process of a 3D display apparatus 200 or the light transmission control unit 204.

As shown in FIG. 6, polarized light outputted from a display unit 202 is passing through or modulated by the light transmission control unit 204, and then the light is controlled onto different viewing zones at different times by the light transmission control unit 204. For example, when the light is controlled onto viewing zone 1 at the first time slot, no image is displayed in viewing zone 2 and viewing zone 3. When the light is controlled onto viewing zone 2 at the second time slot, no image is displayed in viewing zone 1 and viewing zone 3. Similarly, when the light is controlled onto viewing zone 3 at the third time, no image is displayed in viewing zone 1 and viewing zone 2.

That is, the display on viewing zones is time-multiplexed. The switching time between the viewing zones may be shorter than the flashing interval perceived by viewer's eyes to avoid the perception of flicker for switching the viewing zones, i.e., shorter than the persistence of vision of the viewer(s). Therefore, the refreshing rate for the display unit 202 is configured based on the number of the viewing zones. The refreshing rate is configured to a higher rate when the number of viewing zones is increased. As previously explained, the refreshing rate for these three viewing zones may be configured as three times higher than or equal to the standard 60 Hz refreshing rate, that is, the refreshing rate of the display unit 202 is N*60 Hz, where N is the number of viewing zones and N=1, 2, 3, . . . . For three(s) viewing zones, the refreshing rate can be 60 Hz*3=180 Hz.

More particularly, the light transmission control unit 204 is controlled by the synchronization control unit 208 to, based on time division/multiplexing, control the light onto different viewing zones at different times. The time for refreshing all the viewing zones is shorter than 1/60 s. That is, the refreshing rate is higher than 60 Hz for each viewing zone. Although 60 Hz is used as an example, other frequency may also be used so long as to keep the viewing zones displayed in a time multiplexing fashion.

By such time-multiplexing mechanism, the light transmission control unit 204 projects 3D images in various viewing zones. The light is displayed in different viewing zones through changing characteristics of certain optical devices within the light transmission control unit 204 (e.g., the opening position of a slit grating in the light transmission control unit 204). Both the display unit 202 and the stereoscopic unit 206 arrange and display 3D images when the light is controlled onto a specific viewing zone by the light transmission control unit 204. The synchronization control unit 208 coordinate operations of the display unit 202, the stereoscopic unit 206, and/or the light transmission control unit 204 to achieve dynamic 3D image displays.

For example, when the synchronization control unit 208 sends display signals to the light transmission control unit 204, it also sends corresponding image arranging signals and control signals to the display unit 202 and the stereoscopic unit 206, which then displays 3D images in the display unit 202 in viewing zones controlled by the light transmission control unit 204.

Figure 7:
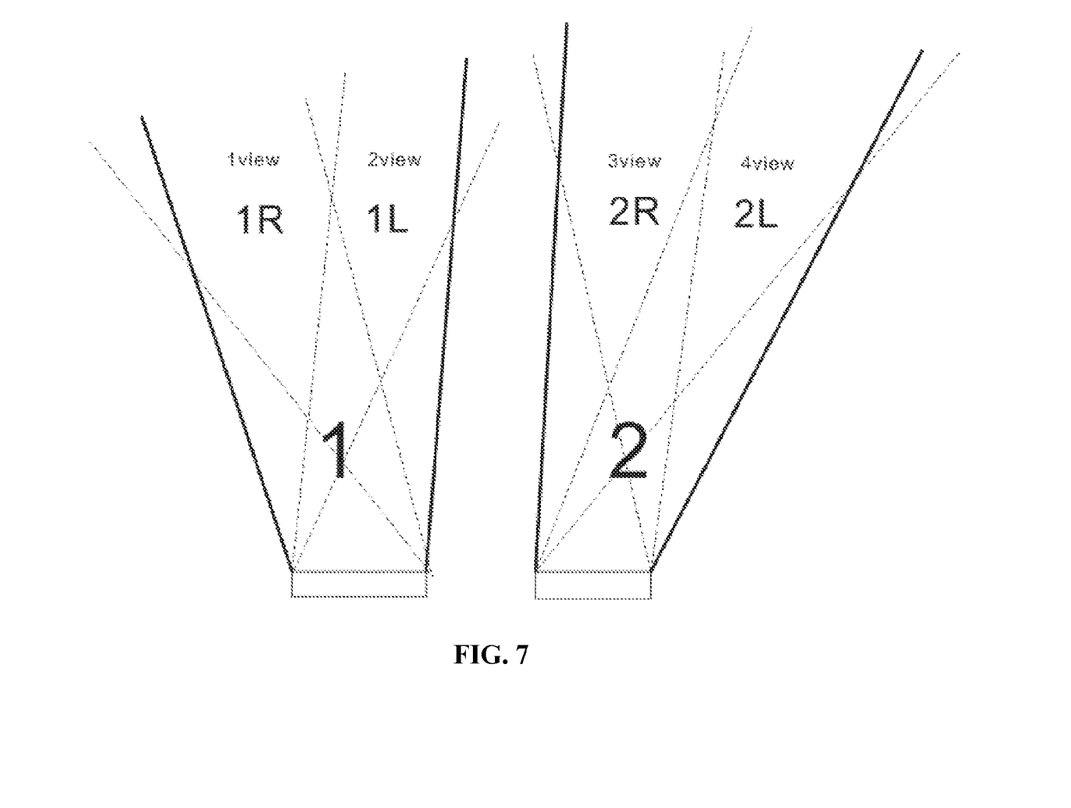
FIG. 7 illustrates another exemplary operating process of a 3D display apparatus consistent with the disclosed embodiments.

Further, at the next refresh time, the light transmission control unit 204 controls the light onto the next viewing zone. In order to connect sequentially stereoscopic images at the junction of two viewing zones, the synchronization control unit 208 may determine the first view of the current viewing zone based on the last view of the previous viewing zone. FIG. 7 illustrates an exemplary operating process for view arrangement of the viewing zones.

As shown in FIG. 7, the light transmission control unit 204 controls the light onto zone 1 at time T1. The stereoscopic unit 206 separates the light to form several views arranged sequentially in zone 1. For example, two views 1view and 2view are formed in zone 1. In the present disclosure, the number of views may be kept small such that the resolution of the view images may be kept high. The fewer the total number of views, the more likely inverse viewing zones may appear. However, the synchronization control unit 208 may dynamically adjust the view sequence to ensure the inverse viewing zones can be avoided for multiple viewers.

After the time T1 operation is completed, the light transmission control unit 204 controls the light onto zone 2 at time T2. The stereoscopic unit 206 separates the light to form several views arranged sequentially in zone 2. For example, two views 3view and 4view are formed in zone 2. In addition, 3view in zone 2 and 2view in zone 1 are connected with or adjacent with each other. Thus, continuous view distribution is provided. A viewer does not feel significant change of zones when the viewer views images in the different viewing zones.

Thus, images with different parallax can be seen in different viewing zones in front of the display of the auto-stereoscopic 3D display apparatus, and images with fixed parallax can be seen in one viewing zone. For example, a viewer can view the image 1 when the user is in the viewing zone 1, while others in other zones may be unable to view the image 1. Similarly, the viewer can view the image 2 when the viewer is in the viewing zone 2. Different view images are arranged by the view image arrangement previously described, displayed in the display unit 202, and then separated into appropriate viewing zones by the light transmission control unit 204 (e.g., the grating within the light transmission control unit 204).

Further, when a viewer moves from one location to another location in front of the display unit 202, the sensing unit captures change of the viewer's location. The synchronization control unit 208 adjusts the display sequence of 3D images if the viewer is located in an inverse viewing zone.

For example, as shown in FIG. 7, at the beginning, the viewer is in the viewing zone 1, with two views 1R and 1L. The inverse viewing zone is the space between the view 1L and the view 2R. Then, the viewer moves from 1R to 1L. To ensure the viewer can view proper views when the viewer moves to 1L, the synchronization control unit 208 may rearrange the images by a new sequence (e.g., shifting the view images), and the light transmission control unit 204 may adjust the viewing zones such that the inverse viewing zone is moved to the space between 2R and 2L. That is, after the sequence of the views is rearranged, the 3D display apparatus 200 or the synchronization control unit 208 can display the views using the new sequence instead of the previous sequence such that views 1L and 2R are in normal viewing condition for the viewer without getting into the previous inverse viewing zone between 1L and 2R. Therefore, the viewer(s) can perceive normal 3D images.

Additionally or optionally, the synchronization control unit 208 may determine whether there is any adjacent viewer on either side of the viewer or the viewer in the inverse viewing zone. If there is an adjacent viewer on one side of the inverse viewing zone, the synchronization control unit 208 may adjust the view arrangement at the other side of the inverse viewing zone to change the inverse viewing zone to a correct viewing zone and to move the inverse viewing zone to the other side, because there is no viewer on the other side. That is, while the inverse viewing zone is changed to the correct viewing zone, the correct viewing zone of the other side may be changed to the inverse viewing zone.

Additionally or optionally, if the current viewing zone (i.e., the viewing zone having the viewer) is adjusted to avoid the inverse viewing zone, while there is an adjacent viewer in a neighboring viewing zone, the view sequence adjustment may be performed on the current viewing zone by adjusting the view that is farthest to the adjacent viewer.

Figure 8:
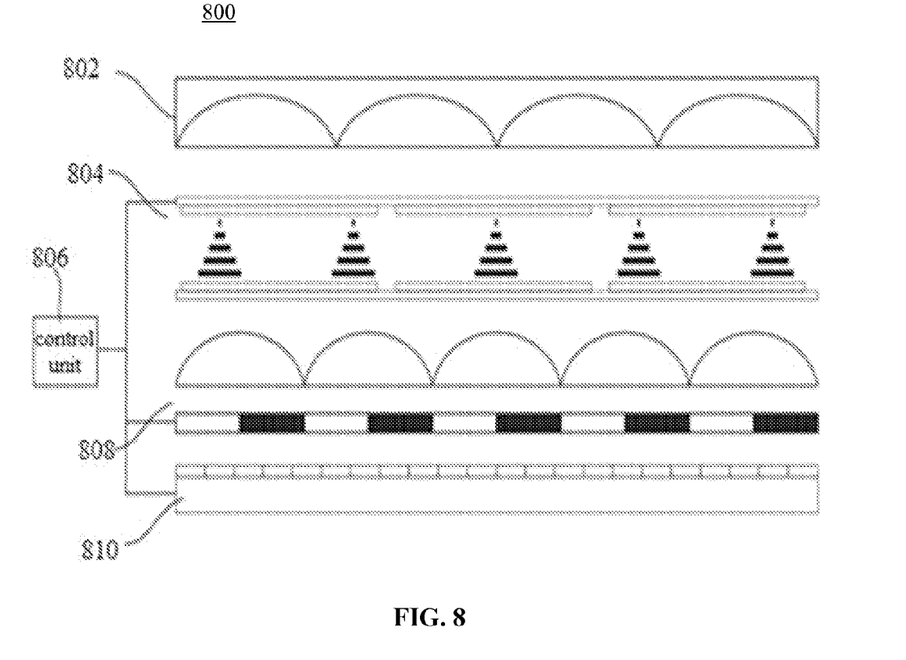
FIG. 8 illustrates an exemplary structure of a 3D display apparatus consistent with the disclosed embodiments.

FIG. 8 illustrates one exemplary structure of a 3D display apparatus 800 consistent with the disclosed embodiments. As shown in FIG. 8, 3D display apparatus 800 includes a light separation unit 802, a polarized light conversion device 804, a synchronization control unit 806, a light transmission control unit 808, and a display unit 810. Other types of designs or configurations may also be used.

The light separation unit 802 may include a lens unit, a slit grating unit, or a 2D/3D switching lens unit. Other device may also be included. The light separation unit 802 and the light conversion device 804 may be referred to as the stereoscopic unit, to be used to form 3D stereoscopic images in various viewing zones.

When light separation unit 802 is configured as a 2D/3D switching lens unit, 2D/3D switching lens unit 802 may be configured to perform switching between 2D and 3D mode dynamically. Polarized light conversion device 804 is configured to convert the direction of the emitted polarization light to a polarization state for light separation unit 802. Further, light transmission control unit 808 may include a liquid crystal slit grating unit and a lens unit configured to achieve controlling the light from the display unit 810 into different viewing zones.

During initial operation, the time period between each 3D image frame is divided into various time intervals based on the refreshing rate of the display unit 810. In each time interval, control unit 806 adjusts the stereoscopic image according to viewing positions of multiple viewers. That is, based on the position information from the sensing unit, control unit 806 rearranges the view images in one viewing zone at each time interval such that all viewers can view the proper 3D image.

More specifically, at time T1, control unit 806 receives the position information of viewers from the sensing unit and generates control signals to control various units to display images in viewing zone 1. Display unit 810 outputs the images arranged in viewing zone 1.

Light transmission control unit 808 receives display signals of viewing zone 1 from the synchronization control unit 806, and controls a liquid crystal slit grating of the light transmission control unit 808 accordingly. For example, light transmission control unit 808 may control the ON status of the liquid crystal slit grating, i.e., opening the portion of the slit grating corresponding to a viewing zone for displaying. That is, the periodic structure of the slit grating corresponding to viewing zone 1 can be formed.

Further, polarized light conversion device 804 converts the direction of the emitted polarized light to the required polarization state for 2D/3D switching lens 802. The converted light passes through, for example, a lenticular grating to complete view distribution within viewing zone 1. Thus, the 3D display apparatus 800 completes the display of 3D image in viewing zone 1.

At time T2, synchronization control unit 806 generates control signals to control various units to display images in viewing zone 2. Display unit 810 outputs the images arranged in viewing zone 2. Display unit 810 displays the view image next to the last view image in the viewing zone 1, and subsequent view images.

Light transmission control unit 808 receives display signals of viewing zone 2 from the synchronization control unit 806, and controls the liquid crystal slit grating of the light transmission control unit 808 accordingly. For example, light transmission control unit 808 may control the ON status of the liquid crystal slit grating, i.e., opening the portion of the slit grating corresponding to the viewing zone for displaying. That is, the periodic structure of the slit grating corresponding to viewing zone 2 can be formed.

Further, polarized light conversion device 804 converts the direction of the emitted polarized light to the required polarization state for 2D/3D switching lens 802. The converted light passes through, for example, a lenticular grating to complete view distribution within viewing zone 2. Thus, the 3D display apparatus 800 completes the display of 3D image in viewing zone 2.

Similarly, for other time T3, . . . , view images can be displayed in viewing zones 3, . . . . Finally, the view images are displayed in all the viewing zones, and the synchronization control unit 806 controls the units to repeat the above process for all the viewing zones. After completing 3D display of all the viewing zones, based on the position information of the viewer received from the sensing unit, the synchronization control unit 806 adjusts the sequence of view images, and then displays the new view sequence from the time on.

Figure 9:
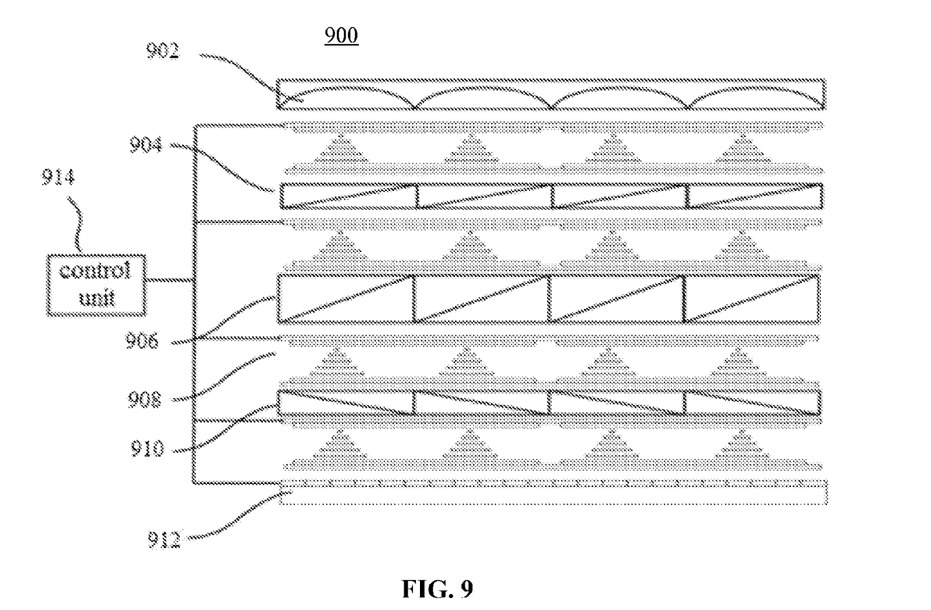
FIG. 9 illustrates another exemplary structure of a 3D display apparatus consistent with the disclosed embodiments.

FIG. 9 illustrates another exemplary structure of a 3D display apparatus 900 consistent with the disclosed embodiments. As shown in FIG. 9, 3D display apparatus 900 includes a 2D/3D switching lens 902, a light direction control unit 904, a light direction control unit 910, a polarized light conversion device 906, an electrode section 908, a display unit 912, and a synchronization control unit 914. Certain device may be omitted and other devices may be added.

A light direction control unit 910 may be configured to change the light transmission direction of incident light with different polarizations or not to change the light transmission direction at all. The light direction control unit 904, the polarized light conversion device 906, electrode section 908, and the light direction control unit 910 may form a light transmission control unit to control the light onto a specific viewing zone at a particular time.

Each of light direction control unit 904 and light direction control unit 910 in the light transmission control unit may be composed of two different materials. A first material may be made of an optically isotropic material with a single refractive index of $n_1$, and a second material may be made of an optically anisotropic material and may be birefringent or double refraction, meaning the optically anisotropic material has two different refractive indices, an ordinary refractive index $n_o$ and an extraordinary refractive index $n_e$.

Lights with a polarization direction perpendicular to the second material's optical axis have the refractive index of $n_o$; while lights with a polarization direction parallel to the second material's optical axis have a refractive index of $n_e$. Further, $n_1=n_0$, and $n_0>n_e$. Thus, when the refractive index of the first material equals to the refractive index of the second material, the light transmission direction is unchanged by the two-material structure. When the refractive index of the first material does not equal to the refractive index of the second material, the light transmission direction is changed by the two-material structure onto corresponding viewing zones.

Thus, a single light direction control unit may control a single viewing zone. Multiple light direction control units may needed to control multiple viewing zones. The polarized light conversion device 906 can be configured to change the direction of the polarization such that the light transmission direction can be controlled by the light direction control unit positioned adjacent to the polarized light conversion device 906.

Thus, as shown in FIG. 9, light direction control unit 904 and light direction control unit 910 can separately controlled to have light refraction, e.g., one of them has light refraction while the other does not, both of them have corresponding light refractions, or none of them has light refraction. Thus, light direction control unit 904 and light direction control unit 910 can realize two viewing zones with a total of 4 views. Other configuration may also be used.

Comparing with the previously described example in FIG. 8, the slit grating structure used to form viewing zones is omitted, and the light utilization efficiency of the 3D display may be further improved. The power consumption may also be lowered to enhance environmental friendliness.

By using the disclosed systems and methods, a high-resolution stereoscopic display for multiple viewers can be achieved. The disclosed systems perform view image arrangement based on initial viewer information from the sensing unit to ensure all viewers are in normal viewing zones and also use relatively small number of views for the view image arrangement. Because the number of the views is relatively small, the resolution in each viewing zone can be significantly increased, even when the number of inverse viewing zones may be increased, which is further resolved by the disclosed structures and algorithms.

Using the disclosed systems and methods, when the sensing unit detects the change of the viewer's location, the appropriate information is passed to a control unit. Based on specific values of change of the viewer's location, the control unit determines whether the viewer is currently in an inverse viewing zone. If the viewer is still in the correct viewing zone, the view arrangement is not changed. On the other hand, if the viewer enters into the inverse viewing zone, the control unit can adjust the view image arrangement (i.e., view sequence) to move the inverse viewing zone to a location without any viewer. Thus, all viewers may perceive normal stereoscopic effect.

Using the disclosed systems and methods, the control unit may analyze the position of the viewer in the inverse viewing zone to determine whether there is any adjacent viewer on either side of the viewer. If is an adjacent viewer on one side of the inverse viewing zone, the control unit adjusts the view arrangement at the other side of the inverse viewing zone to change the inverse viewing zone to a correct viewing zone and to move the inverse viewing zone to the other side because there is no viewer on the other side. Because the control unit does not change the view arrangement in other viewing zones, no impact is on viewing effect for other viewers in the other viewing zones.

Although the present disclosure has been disclosed together with the preferred embodiments which are shown and described in detail, those skilled in the art understand that various improvements can be made to the above-described apparatus for a multiple-viewer auto-stereoscopic 3D display, without departing from the contents of the present disclosure. Therefore, the scope of the present disclosure should be defined by the attached claims.

What is claimed is:

1. A multiple-viewer auto-stereoscopic display apparatus, comprising:
a display unit configured to display a view sequence of a plurality of view images of a 3D image in multiple viewing zones to one or more viewers;
a light transmission control unit configured to control light transmission to a particular viewing zone;
a light separation unit configured to separate the plurality of view images for the viewers to perceive 3D display; and
a synchronization control unit configured to:
synchronize refreshing of the display unit and the light transmission control unit, wherein a refreshing rate of the display unit equals to a refreshing rate of the light transmission control unit; and
dynamically adjust the view sequence based on the position information of the one or more viewers.

2. The multiple-viewer auto-stereoscopic display apparatus according to claim 1, wherein:
provided that N is a total number of the viewing zones, a refreshing rate of the display unit is higher than or equal to N*60 Hz.

3. The multiple-viewer auto-stereoscopic display apparatus according to claim 1, wherein:
the synchronization control unit is further configured to control the light transmission control unit to control the light from the view images into the multiple viewing zones by time-multiplexing.

4. The multiple-viewer auto-stereoscopic display apparatus according to claim 3, wherein the light transmission control unit further includes:
a liquid crystal slit grating controlled by the synchronization control unit to open a portion of the slit grating corresponding to a viewing zone for displaying, by forming a periodic structure of the slit grating corresponding to the viewing zone.

5. The multiple-viewer auto-stereoscopic display apparatus according to claim 3, wherein the light transmission control unit further includes:
a plurality of direction control units, equal to a total number of viewing zones, each configured to control lights of the view images into a separate viewing zone.

6. The multiple-viewer auto-stereoscopic display apparatus according to claim 5, wherein each of the direction control unit includes:
a first material made of an optically isotropic material with a single refractive index of $n_1$;
a second material made of an optically anisotropic material having two different refractive indices, an ordinary refractive index $n_o$ and an extraordinary refractive index $n_e$, wherein $n_1=n_0$, and $n_0>n_e$;
when polarized light with a first direction enters the light transmission control unit, the first material and the second material have equal refractive index and the polarized light is not refracted; and when polarized light with a second direction enters the light transmission control unit, the first material and the second material have different refractive indices and the polarized light is refracted.

7. The multiple-viewer auto-stereoscopic display apparatus according to claim 6, wherein the light transmission control unit further includes:
a polarized light conversion device configured to control polarization directions of light of the view images to selectively have the first direction and the second direction.

8. The multiple-viewer auto-stereoscopic display apparatus according to claim 1, further including:
a sensing unit configured to determine whether there is any viewer located between two neighboring viewing zones and to send position information of the viewer to the synchronization control unit,
wherein the synchronization control unit is further configured to determine whether the viewer is in an inverse viewing zone and, when the viewer is in an inverse viewing zone, adjust the view sequence into a new view sequence such that the viewer is not in the inverse viewing zone.

9. The multiple-viewer auto-stereoscopic display apparatus according to claim 8, wherein:
the new view sequence includes a first expanded view to replace a last view of the view sequence, or includes a second expanded view to replace a first view of the view sequence such that the viewer is located in a correct viewing zone.

10. The multiple-viewer auto-stereoscopic display apparatus according to claim 8, wherein:
the new view sequence is obtained by shifting the view sequence.

11. The multiple-viewer auto-stereoscopic display apparatus according to claim 8, wherein:
the sensing unit is further configured to determine whether there is an adjacent viewer in a neighboring viewing zone; and
the synchronization control unit is further configured to, when there is an adjacent viewer in a neighboring viewing zone, adjust a view in a current viewing zone and farthest to the adjacent viewer to change the inverse viewing zone to a correct viewing zone.

12. A method for a multiple-viewer auto-stereoscopic display apparatus for displaying on a display unit a view sequence of a plurality of view images of a 3D image in multiple viewing zones to one or more viewers, comprising:
using a light transmission control unit to control light transmission to a particular viewing zone;
separating the plurality of view images for the viewers to perceive 3D display;
synchronize refreshing of the display unit and the light transmission control unit display the view images into the multiple viewing zones by time-multiplexing, wherein a refreshing rate of the display unit equals to a refreshing rate of the light transmission control unit; and
dynamically adjust the view sequence based on the position information of the one or more viewers.

13. The method according to claim 12, wherein:
provided that N is a total number of the viewing zones, a refreshing rate of the display unit is higher than or equal to N*60 Hz.

14. The method according to claim 12, wherein dynamically adjusting the view sequence further includes:
determining whether there is any viewer located between two neighboring viewing zones;
providing position information of the viewer;
determining whether the viewer is in an inverse viewing zone; and
when the viewer is in an inverse viewing zone, adjusting the view sequence into a new view sequence such that the viewer is not in the inverse viewing zone.

15. The method according to claim 14, wherein:
the new view sequence includes a first expanded view to replace a last view of the view sequence, or includes a second expanded view to replace a first view of the view sequence such that the viewer is located in a correct viewing zone.

16. The method according to claim 14, wherein:
the new view sequence is obtained by shifting the view sequence.

17. The method according to claim 14, further including:
determining whether there is an adjacent viewer in a neighboring viewing zone; and
when there is an adjacent viewer in a neighboring viewing zone, adjusting a view in a current viewing zone and farthest to the adjacent viewer to change the inverse viewing zone to a correct viewing zone.

* * * * *